United States Patent
Tsai et al.

(10) Patent No.: US 7,209,310 B1
(45) Date of Patent: Apr. 24, 2007

(54) DISK DRIVE IDENTIFYING STARTING TRACK BY PERFORMING MULTIPLE LOAD OPERATIONS

(75) Inventors: Chun Sei Tsai, Tustin, CA (US); Ngoc Le, Fountain Valley, CA (US); Jenghung Chen, Cupertino, CA (US); Hien Chu, Santa Ana, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/188,947

(22) Filed: Jul. 25, 2005

(51) Int. Cl.
*G11B 21/02* (2006.01)

(52) U.S. Cl. .................. 360/75; 360/78.08

(58) Field of Classification Search ............ None
See application file for complete search history.

(56) References Cited

U.S. PATENT DOCUMENTS

| | | | | |
|---|---|---|---|---|
| 5,027,234 A | * | 6/1991 | Kawahara | 360/77.08 |
| 5,075,805 A | * | 12/1991 | Peddle et al. | 360/61 |
| 5,559,648 A | * | 9/1996 | Hunter et al. | 360/75 |
| 5,870,237 A | | 2/1999 | Emo et al. | |
| 5,973,870 A | * | 10/1999 | Boutaghou et al. | 360/53 |
| 6,504,663 B2 | * | 1/2003 | Hirano et al. | 360/48 |
| 6,920,007 B2 | * | 7/2005 | Tominaga et al. | 360/75 |
| 6,937,419 B2 | * | 8/2005 | Suk et al. | 360/75 |
| 2002/0071219 A1 | | 6/2002 | Yoshida et al. | |
| 2004/0179289 A1 | | 9/2004 | Suk et al. | |

* cited by examiner

*Primary Examiner*—K. Wong
(74) *Attorney, Agent, or Firm*—Jason T. Evans, Esq.; Howard H. Sheerin, Esq.

(57) ABSTRACT

A disk drive is disclosed comprising a disk having a plurality of servo sectors defining a plurality of servo tracks, wherein each servo sector comprises a track address identifying a corresponding servo track. A head is actuated over the disk, and a ramp is positioned near an outer diameter of the disk, wherein an edge of the ramp extends over a plurality of the servo tracks. The head is loaded from the ramp onto the disk, and a track address in at least one of the servo sectors is detected and stored. The process is repeated a number of times, and then a starting track proximate an outer diameter of the disk is identified in response to the detected and stored track addresses.

16 Claims, 6 Drawing Sheets

FIG. 6

DISK DRIVE IDENTIFYING STARTING TRACK BY PERFORMING MULTIPLE LOAD OPERATIONS

BACKGROUND OF THE INVENTION

1. Field of the Invention

The present invention relates to disk drives. More particularly, the present invention relates to a disk drive identifying a starting track address by performing multiple load operations.

2. Description of the Prior Art

Disk drives comprise a head connected to a distal end of an actuator arm which is rotated about a pivot by a voice coil motor (VCM) in order to actuate the head radially over a disk. The VCM comprises a voice coil that generates a magnetic flux when energized with current. The magnetic flux generated by the voice coil interacts with magnetic flux generated by permanent magnets to generate a torque that rotates the actuator arm about the pivot. When the disk drive is powered down or idle, the head is parked in a landing zone at the inner diameter of the disk or unloaded onto a ramp at the outer diameter of the disk.

In disk drives employing ramp loading/unloading, an edge of the ramp typically extends out over a number of the servo tracks at the outer diameter of the disk. This allows a tab extending from the actuator arm to engage the ramp before the head "falls off" the outer diameter of the disk. It is desirable to determine how far the edge of the ramp extends over the outer diameter of the disk to maximize the usable recording surface of the disk. U.S. Pat. No. 5,559,648 discloses a method for detecting the edge of the ramp to identify the starting track (track 0) at the outer diameter of the disk prior to servo writing the disk using an external servo writer. The steps of detecting the edge of the ramp include moving the head to a known radial location, writing a known pattern (e.g., a clock pattern), and then attempting to read the known pattern. If the known pattern can be read without interference from the ramp, the head is moved radially outward and the process repeated until interference from the ramp prevents accurate detection of the known pattern. The starting track (track 0) is then identified as a marginal distance radially inward from the location where the interference is detected, and the external servo writer servo writes the disk from this starting track. Although this technique improves capacity (or reliability) by maximizing recording area across the disk surface, it increase the cost and complexity of the servo writing process. In addition, it precludes using an external media writer to servo write a disk which is subsequently installed into a disk drive.

There is, therefore, a need to identify a starting track in a disk drive at the outer diameter of a disk adjacent the edge of a ramp in order to optimize the recording density without significantly increasing the cost or complexity of servo writing the disk.

SUMMARY OF THE INVENTION

The present invention may be regarded as a disk drive comprising a disk having a plurality of servo sectors defining a plurality of servo tracks, wherein each servo sector comprises a track address identifying a corresponding servo track. The disk drive further comprises a head actuated over the disk, and a ramp positioned near an outer diameter of the disk, wherein an edge of the ramp extends over a plurality of the servo tracks. The head is loaded from the ramp onto the disk, and a track address in at least one of the servo sectors is detected and stored. The head is then unloaded onto the ramp and then loaded back onto the disk to again detect and store a track address in at least one of the servo sectors. The process is repeated a number of times, and then a starting track proximate an outer diameter of the disk is identified in response to the detected and stored track addresses.

In one embodiment, the ramp is installed into the disk drive after writing the servo sectors on the disk. In one embodiment, the servo sectors are written on the disk using an external servo writer using the head internal to the disk drive. In another embodiment, the servo sectors are written on the disk using an external media writer, and the disk and ramp are installed into the disk drive after the servo sectors are written on the disk.

In yet another embodiment, the starting track is identified using a margin that accounts for mechanical variation.

In another embodiment, the disk drive comprises a plurality of heads each actuated over a corresponding disk surface, and the head is loaded/unloaded a plurality of times for each head to identify the starting track.

In yet another embodiment, the disk further comprises a plurality of data tracks, and at least one of the data tracks is partitioned into a plurality of data sectors in response to the starting track, and in one embodiment, a linear bit density is selected for each data sector in response to the starting track.

The present invention may also be regarded as a method of identifying a starting track proximate an outer diameter of a disk in a disk drive. The disk comprises a plurality of servo sectors defining a plurality of servo tracks, wherein each servo sector comprises a track address identifying a corresponding servo track. The disk drive further comprises a head actuated over the disk, and a ramp positioned near an outer diameter of the disk, wherein an edge of the ramp extends over a plurality of the servo tracks. The head is loaded from the ramp onto the disk, and a track address in at least one of the servo sectors is detected and stored. The head is then unloaded onto the ramp and then loaded back onto the disk to again detect and store a track address in at least one of the servo sectors. The process is repeated a number of times, and then the starting address is identified in response to the detected and stored track addresses.

DESCRIPTION OF THE PREFERRED EMBODIMENTS

Figures 1A, 1B, 1C:
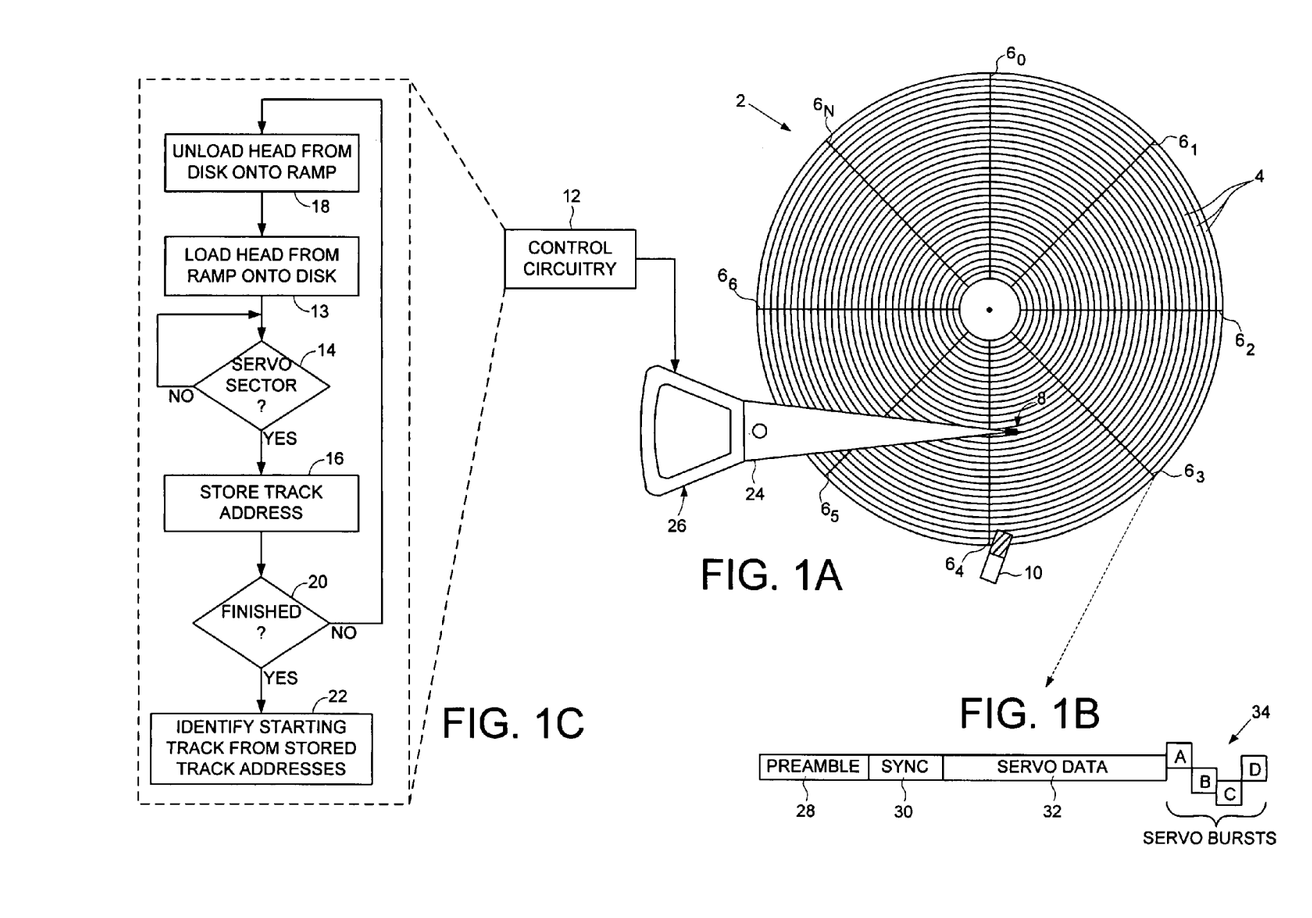
FIG. 1A shows a disk drive according to an embodiment of the present invention comprising a disk having a plurality of servo sectors that define a plurality of servo tracks, and a ramp having an edge that extends over a plurality of the servo tracks.
FIG. 1B shows an example servo sector comprising servo data (e.g., a track address) providing coarse positioning information and servo bursts providing fine positioning information.
FIG. 1C is a flow diagram according to an embodiment of the present invention for identifying a starting track proximate the outer diameter of the disk by repeatedly loading/unloading the head off the ramp and onto the disk, detecting and storing the first track address, and evaluating the stored track addresses.

FIG. 1A shows a disk drive according to an embodiment of the present invention comprising a disk 2 having a plurality of servo sectors $6_0$–$6_N$ defining a plurality of servo tracks 4, wherein each servo sector $6_i$ (FIG. 1B) comprises a track address identifying a corresponding servo track. The disk drive further comprises a head 8 actuated over the disk 2, and a ramp 10 positioned near an outer diameter of the disk 2, wherein an edge of the ramp 10 extends over a plurality of the servo tracks 4. The disk drive further comprises control circuitry 12 for executing the flow diagram of FIG. 1C to identify a starting track proximate an outer diameter of the disk 2. At step 13 the head 8 is loaded from the ramp 10 onto the disk 2, and when at step 14 a servo sector is detected, the track address in the detected servo sector is stored at step 16. The head 8 is then unloaded from the disk 2 back onto the ramp 10 at step 18, and then again loaded back onto the disk at step 13. The track address in the detected servo sector is stored at step 16, and the process is repeated a number of times at step 20. At step 22 a starting track proximate an outer diameter of the disk 2 is identified in response to the detected and stored track addresses.

Any suitable control circuitry 12 may be employed to implement the embodiments of the present invention. In one embodiment, the control circuitry 12 comprises a microprocessor executing instructions, the instructions being operable to cause the microprocessor to perform the steps of FIG. 1C as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 12 comprises suitable logic circuitry, such as state machine circuitry.

In the embodiment of FIG. 1A, the head 8 is connected to a distal end of an actuator arm 24 which is rotated about a pivot by a voice coil motor (VCM) in order to actuate the head 8 radially over the disk 2 (and on/off the ramp 10). The VCM comprises a voice coil 26 which, when energized with current by the control circuitry 12, generates a magnetic flux which interacts with the magnetic flux from permanent magnets (not shown) to generate a torque that rotates the actuator arm 24 about the pivot. In one embodiment, while the head 8 is loaded onto and off the ramp 10, the control circuitry 12 implements a velocity controlled servo loop wherein the velocity feedback for the head 8 is estimated from the back EMF voltage generated by the VCM. While the head 8 is actuated over the disk 2 during normal operation, the control circuitry 12 implements a position controlled servo loop wherein the position feedback for the head 8 is estimated by reading the position information recorded in the servo sectors $6_0$–$6_N$.

In the embodiment of FIG. 1B, each servo sector (e.g., servo sector 63) comprises a preamble 28 for synchronizing timing recovery and gain control, a sync mark 30 for bit synchronizing to servo data 32, and a plurality of servo bursts 34. The servo data 32 comprises the track address for identifying the current track the head 8 is over, and the servo bursts 34 indicate an offset of the head 8 from the track's centerline. The control circuitry 12 processes the track address and servo bursts to generate a position error signal (PES) for the head 8 relative to the centerline of a target track. A servo compensator within the control circuitry 12 processes the PES to generate a control signal applied to the voice coil 26 of the VCM in order to seek the head 8 to the target track and maintain the head 8 over the centerline while performing read/write operations.

The recording capacity of the disk 2 is determined by the data track density (data tracks per inch), the number of data sectors per data track, and the linear bit density of each data sector. In one embodiment, the data track density equals the servo track density, that is, each servo track defines one data track. In an alternative embodiment, each servo track defines more than one data track (e.g., by defining a data track as a fraction of servo track as determined from the servo bursts 34). The servo track density is determined when the servo sectors $6_0$–$6_N$ are written to the disk 2, that is, the radial spacing of the servo sectors $6_0$–$6_N$ determines the servo track density.

In one embodiment, the servo sectors $6_0$–$6_N$ are written on the disk 2 using an external servo writer using the head 8 internal to the disk drive. The external servo writer comprising a positioning pin which engages the actuator arm 24 in order to actuate the head 8 over the disk 2 while using the head 8 to write the servo sectors $6_0$–$6_N$ at each servo track. The external servo writer uses precise positioning mechanics, such as a laser interferometer, in order to maintain the head 8 over the centerline of the current servo track being written, and to position the head 8 over the next servo track. The external servo writer writes the servo sectors $6_0$–$6_N$ over substantially the entire surface of the disk 2 from the outer diameter to the inner diameter. The ramp 10 is then installed into the disk drive such that an edge of the ramp 10 extends over a plurality of the servo tracks 4.

In an alternative embodiment, the servo sectors $6_0$–$6_N$ are written on the disk 2 using an external media writer. An external media writer typically comprises a number of actuator arms and heads for servo writing a number of disks concurrently. After servo writing the disks, one or more of the servo written disks are installed into a disk drive, and then the ramp 10 is installed such that an edge of the ramp 10 extends over a plurality of the servo tracks 4.

Figure 2:
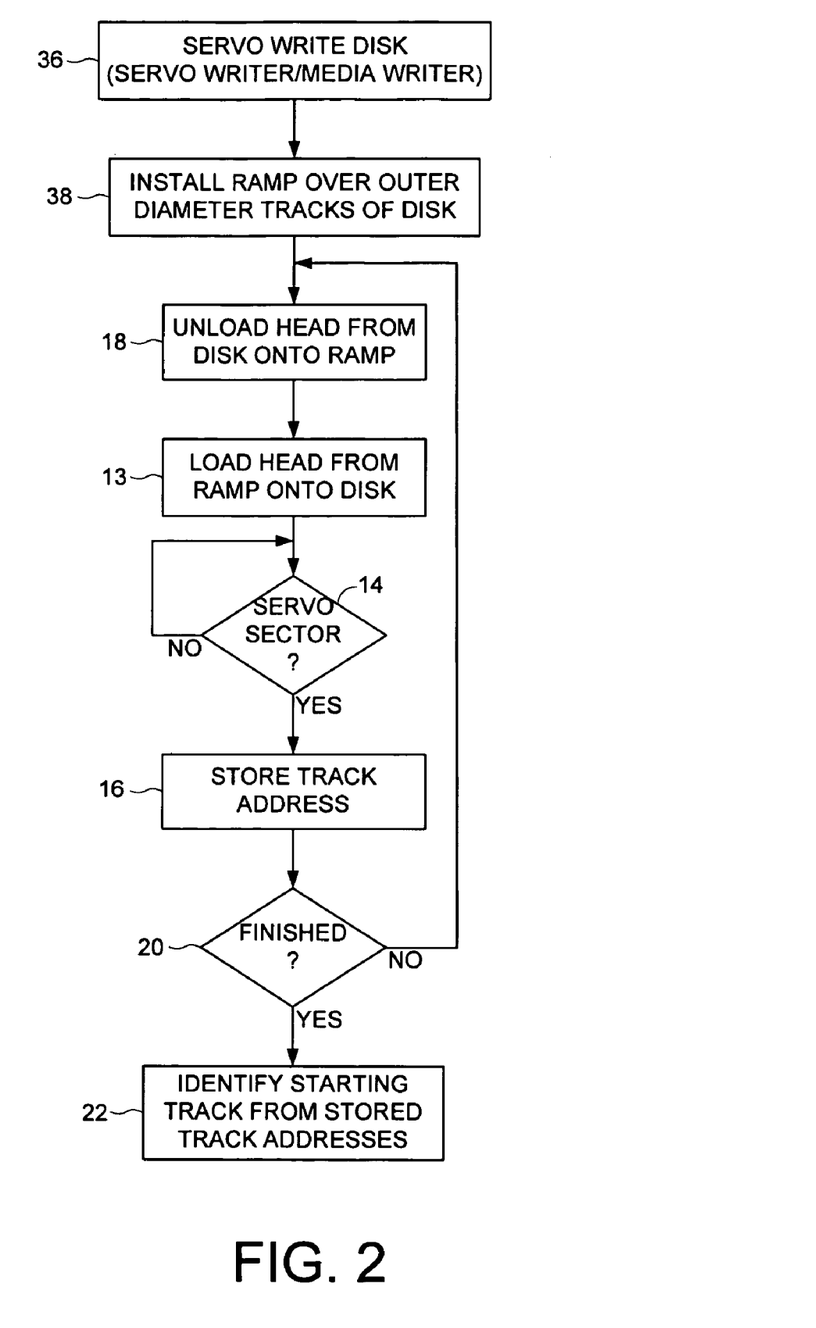
FIG. 2 is a flow diagram according to an embodiment of the present invention wherein a disk is first servo written with the servo sectors, the ramp installed over the outer edge of the disk, and the repetitive load/unload operation performed to identify the starting track.

FIG. 2 shows a flow diagram of the present invention which extends the flow diagram of FIG. 1C by adding step 36 wherein the disk is first servo written using an external servo writer or media writer, and then at step 38 the ramp is installed into the disk drive such that an edge of the ramp 10 extends over a plurality of the servo tracks 4. In one embodiment, the steps of loading/unloading the head 8 and storing the first track address detected is repeated a predetermined number of times at step 20. In another embodiment, the process is repeated at step 20 until a predetermined statistic of the track addresses stored at step 16 reaches a target level. For example, in one embodiment the starting track is identified at step 22 relative to the three-sigma of the track address distribution, and the processes is repeated at step 20 until the derivative of the three-sigma falls below a predetermined threshold.

Figure 3:
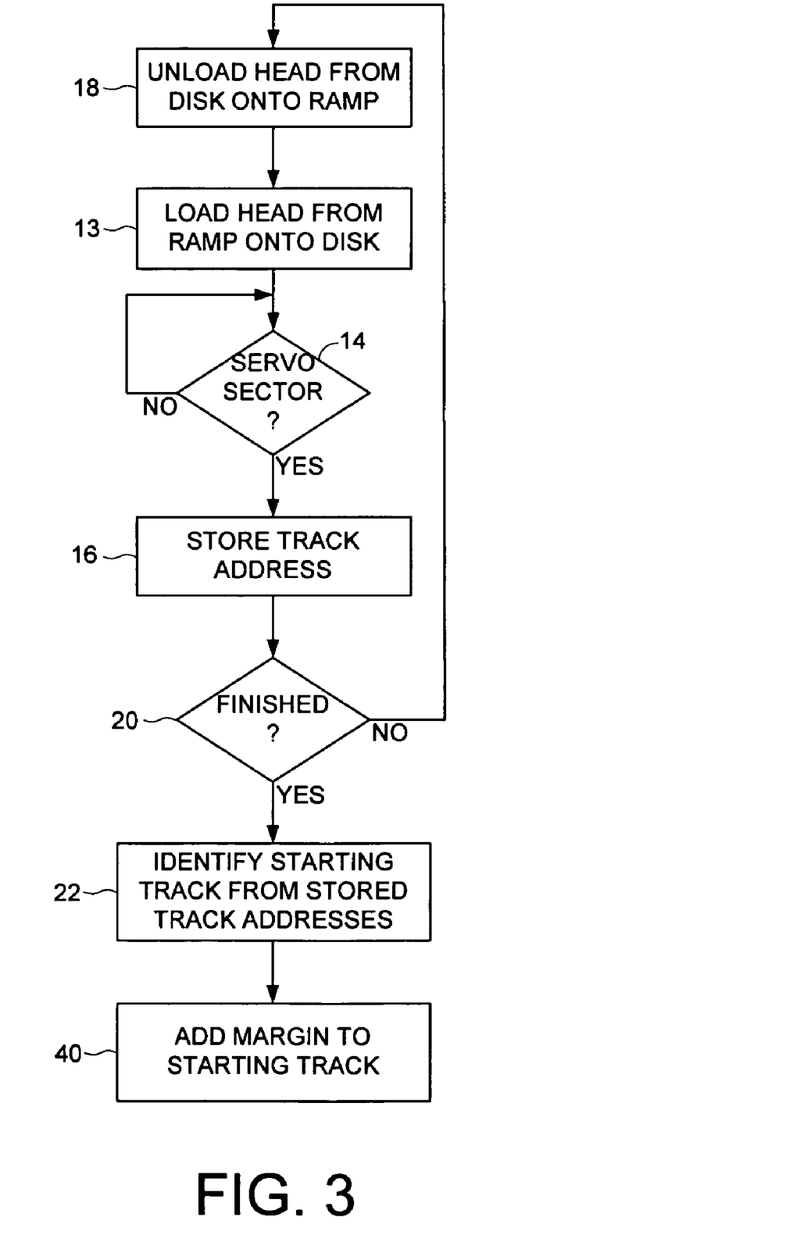
FIG. 3 is a flow diagram according to an embodiment of the present invention wherein a margin is added to the starting track to compensate for mechanical variations due, for example, to temperature fluctuations.

FIG. 3 is a flow diagram according to an embodiment of the present invention which extends the flow diagram of FIG. 1C by adding step 40 wherein a margin is added to the starting track to account for mechanical variation in the disk drive. The mechanical variation may include variation in the geometry of the head 8 (e.g., slider width), variation in the geometry of the ramp 10, and offsets due to the disk slipping from the center axis of the spindle motor (e.g., due to a physical shock to the disk drive).

Figure 4:
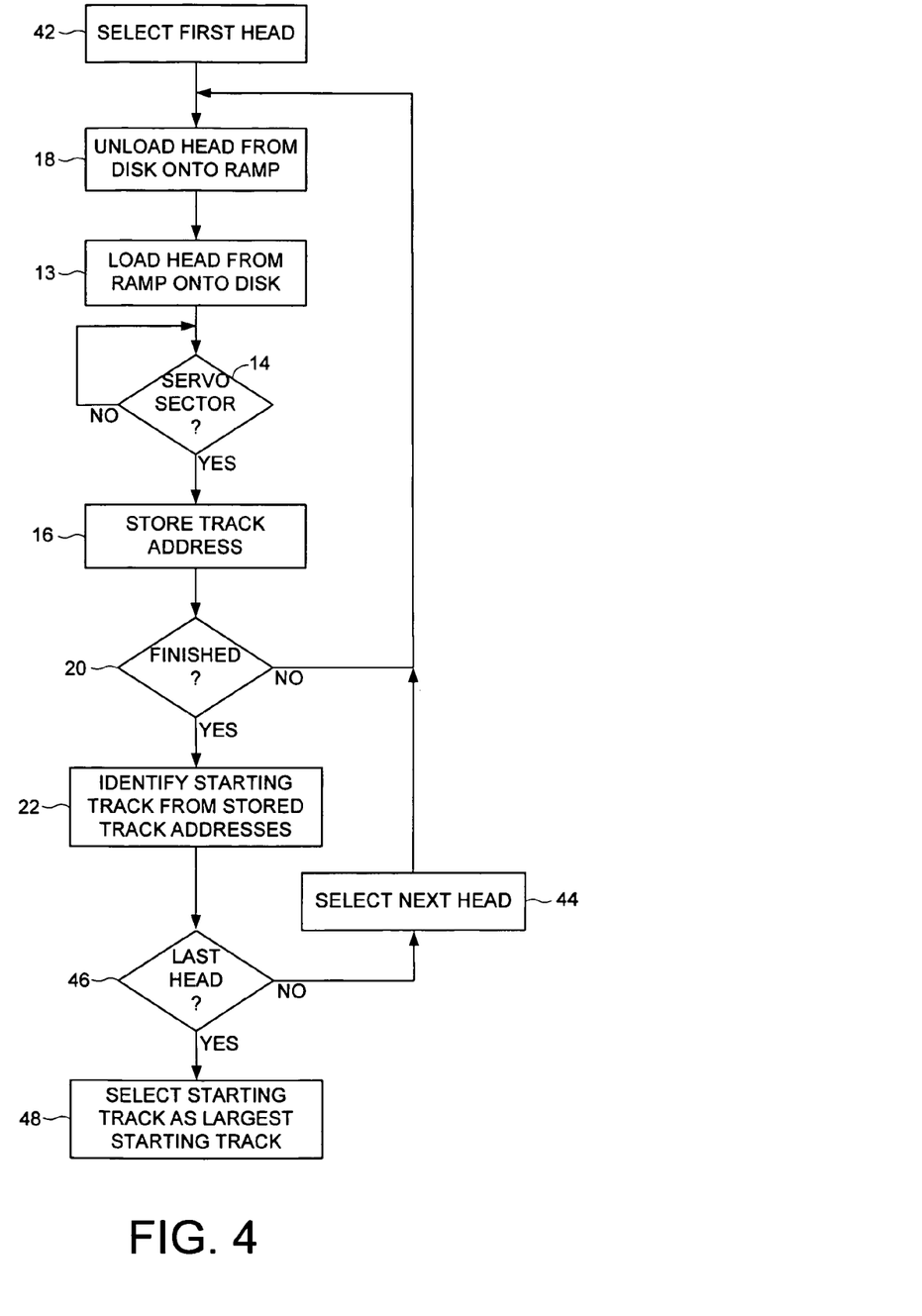
FIG. 4 is a flow diagram according to an embodiment of the present invention wherein the disk drive comprises a plurality of heads actuated over corresponding disk surfaces, and the starting track is identified by performing the load/unload operation for each head.

In another embodiment of the present invention, the disk drive comprises a plurality of heads, wherein each head is actuated over a corresponding disk surface. For example, the disk drive may employ top and bottom heads actuated over top and bottom surface of a single disk or multiple disks. The flow diagram of FIG. 1C is executed for each head and the starting address is identified relative to the worst case head. That is, the largest starting track (closest to the inner diameter of the disk) out of the plurality of starting tracks identified for each head is selected as the starting track for all heads. This embodiment is illustrated in FIG. 4 wherein at step 42 the first head is selected for performing the flow diagram of FIG. 1C, and when finished at step 20 the next head is selected at step 44 until the flow diagram of FIG. 1C has been executed for all of the heads at step 46. At step 48 the starting track is selected as the largest starting track identified at step 22 out of all of the heads.

Figure 5:
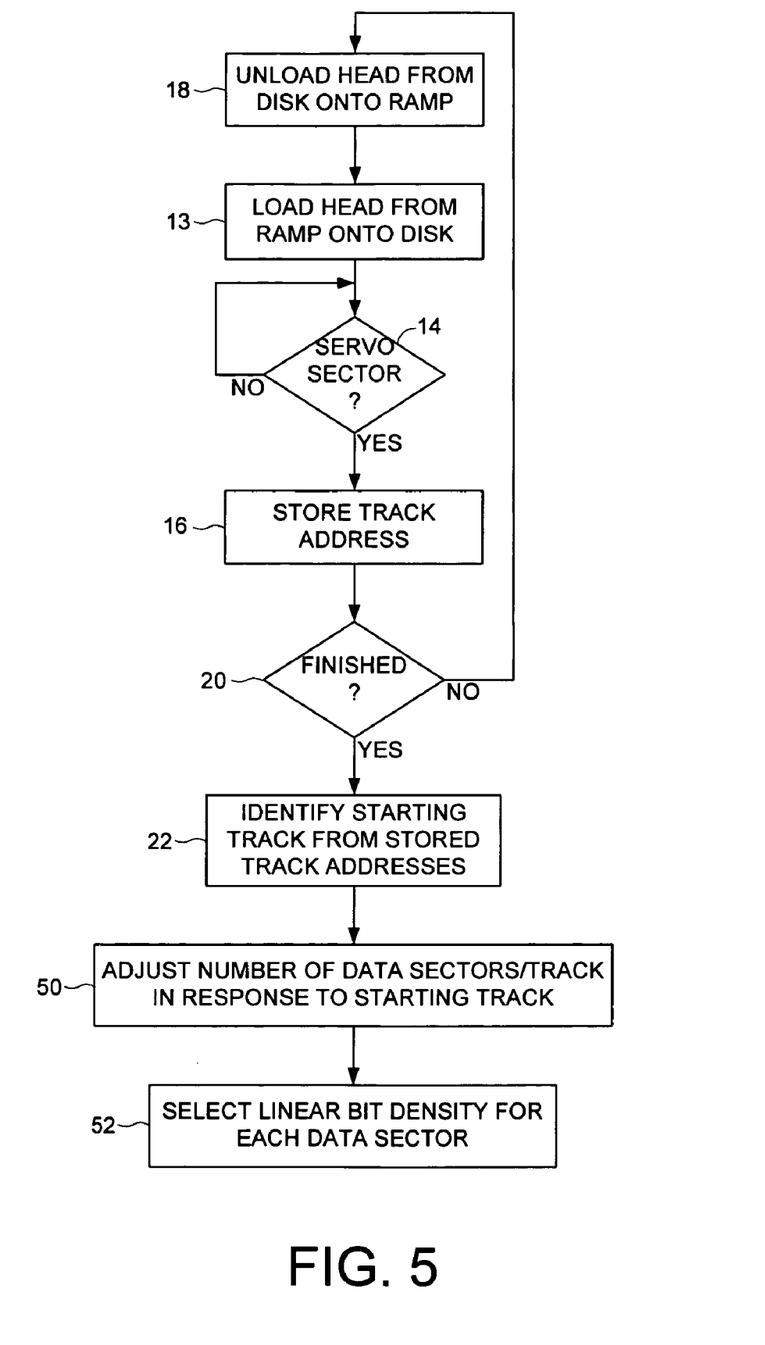
FIG. 5 is a flow diagram according to an embodiment of the present invention wherein the number of data sectors per data track and the linear data density per data sector are selected in response to the starting track.

Identifying an optimal starting track maximizes the usable recording surface by enabling access to the outer diameter tracks while avoiding interference with the ramp 10. If the recording capacity is fixed regardless as to the number of tracks utilized (as determined from the starting track identified using FIG. 1C), the reliability of the disk drive can be improved by selecting the number of data sectors in each data track in response to the starting track. In one embodiment, the number of data sectors in each data track is decreased if the number of data tracks is increased relative to the starting track. In one embodiment, the reliability of the data sectors is increased by increasing the number of redundancy symbols (ECC symbols) to each data sector. In another embodiment, reliability is increased by decreasing the linear bit density of each data sector in response to the starting track. This embodiment is illustrated in the flow diagram of FIG. 5 which extends the flow diagram of FIG. 1C by adding step 50 wherein the number of data sectors per data track is adjusted in response to the starting track, and at step 52 a corresponding linear bit density is selected for each data sector.

Figure 6:
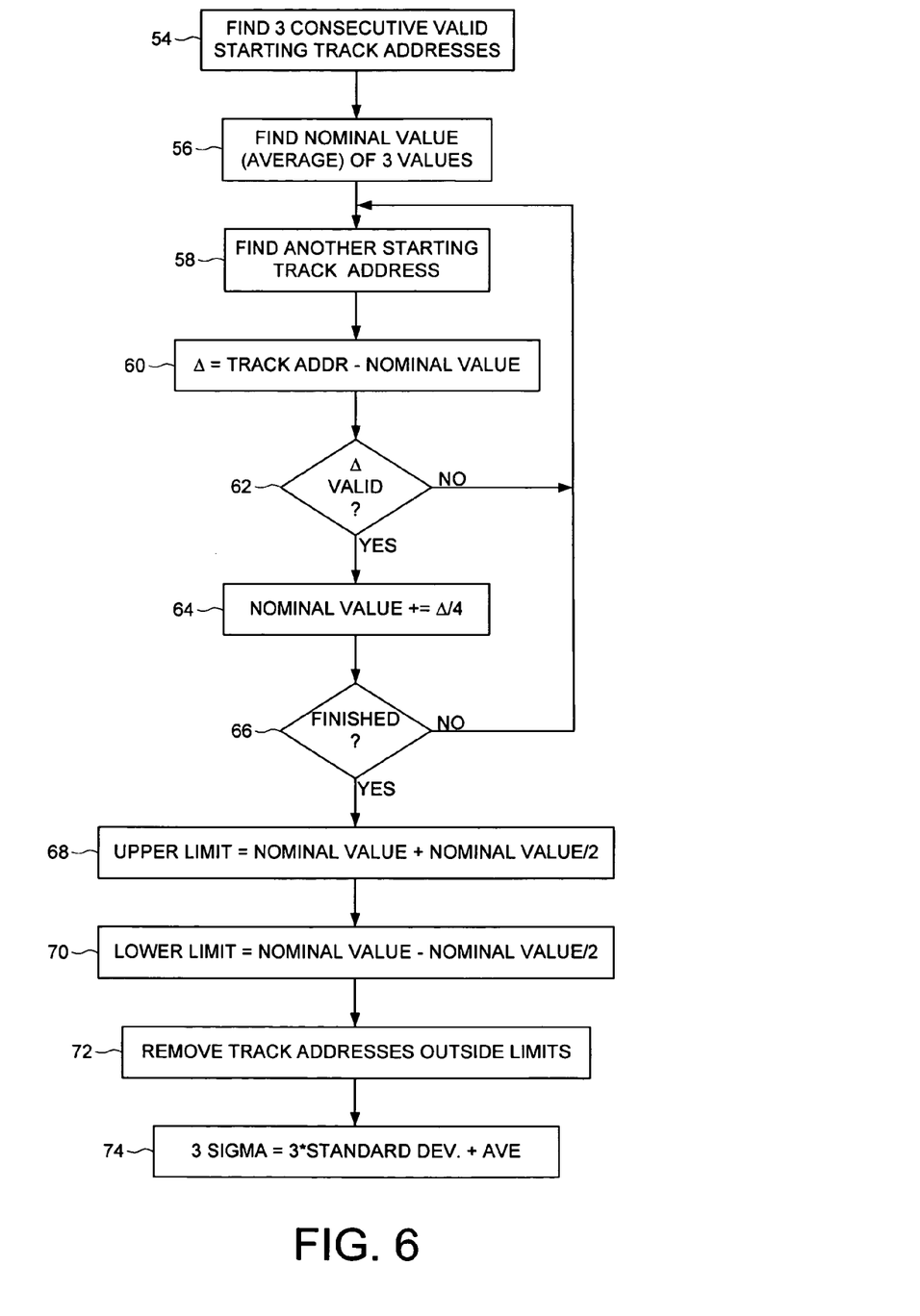
FIG. 6 is a flow diagram according to a specific embodiment of the present invention for identifying the starting track in response to the starting track addresses found during the unload/load operation of FIG. 2.

FIG. 6 is a flow diagram according to a specific embodiment of the present invention for identifying the starting track in response to the starting track addresses found during the unload/load operation of FIG. 2. At step 54 three consecutive valid track addresses are found by performing the unload/load operation of FIG. 2, wherein a starting track addresses is considered valid if it falls within a predetermined range. At step 56 an initial nominal value is computed as the average of the three track addresses found at step 54. At step 58 the unload/load operation of FIG. 2 is performed to find another starting track address, and at step 60 a delta Δ is computed as the difference between the track address and the nominal value. If at step 62 the Δ is valid (falls within a predetermined range), then at step 64 the nominal value is adjusted by adding 25% of Δ. This process is repeated starting with step 58 until at step 66 a sufficient number of track addresses have been found. At step 68 an upper limit is computed as the nominal value plus one-half the nominal value, and at step 70 a lower limit is computed as the nominal value minus one-half the nominal value. At step 72 the track addresses that fall outside the upper and lower limit are removed from the data set, and at step 74 the three-sigma of the remaining data set is computed as three times the standard deviation plus the average, wherein the integer of the result is returned as the starting track.

We claim:

1. A disk drive comprising:
   (a) a disk comprising a plurality of servo sectors defining a plurality of servo tracks, wherein each servo sector comprises a track address identifying a corresponding servo track;
   (b) a head actuated over the disk;
   (c) a ramp positioned near an outer diameter of the disk, wherein an edge of the ramp extends over a plurality of the servo tracks;
   (d) control circuitry for identifying a starting track proximate an outer diameter of the disk by:
      (i) loading the head from the ramp onto the disk;
      (ii) detecting a track address in at least one of the servo sectors;
      (iii) storing the detected track address;
      (iv) unloading the head from the disk onto the ramp;
      (v) repeating steps (i) through (iv) at least once; and
      (vi) identifying the starting track in response to the stored track addresses.

2. The disk drive as recited in claim 1, wherein the ramp is installed into the disk drive after writing the servo sectors on the disk.

3. The disk drive as recited in claim 1, wherein the servo sectors are written on the disk using an external servo writer and using the head internal to the disk drive.

4. The disk drive as recited in claim 1, wherein;
   (a) the servo sectors are written on the disk using an external media writer; and
   (b) the disk and ramp are installed into the disk drive after the servo sectors are written on the disk.

5. The disk drive as recited in claim 1, wherein the control circuitry identifies the starting track using a margin that accounts for mechanical variation.

6. The disk drive as recited in claim 1, further comprising a plurality of heads, wherein:
   (a) each head is actuated over a corresponding disk surface; and
   (b) the control circuitry for performing steps (i) through (iv) a plurality of times for each head.

7. The disk drive as recited in claim 1, wherein:
   (a) the disk further comprises a plurality of data tracks; and
   (b) the control circuitry partitions at least one of the data tracks into a plurality of data sectors in response to the starting track.

8. The disk drive as recited in claim 7, wherein the control circuitry selects a linear bit density for each data sector in response to the starting track.

9. A method of identifying a starting track proximate an outer diameter of a disk in a disk drive, wherein the disk comprises a plurality of servo sectors defining a plurality of servo tracks, each servo sector comprises a track address identifying a corresponding servo track, a head is actuated over the disk, a ramp is positioned near an outer diameter of the disk, and an edge of the ramp extends over a plurality of the servo tracks, the method comprising the steps of:

(a) loading the head from the ramp onto the disk;
(b) detecting a track address in at least one of the servo sectors;
(c) storing the detected track address;
(d) unloading the head from the disk onto the ramp,
(e) repeating steps (a) through (d) at least once; and
(f) identifying the starting track proximate an outer diameter of the disk in response to the stored track addresses.

10. The method as recited in claim 9, wherein the ramp is installed into the disk drive after writing the servo sectors on the disk.

11. The method as recited in claim 9, wherein the servo sectors are written on the disk using an external servo writer and using the head internal to the disk drive.

12. The method as recited in claim 9, wherein:
the servo sectors are written on the disk using an external media writer; and
the disk and ramp are installed into the disk drive after the servo sectors are written on the disk.

13. The method as recited in claim 9, wherein the step of identifying the starting track uses a margin that accounts for mechanical variation.

14. The method as recited in claim 9, wherein the disk drive further comprises a plurality of heads, wherein:
each head is actuated over a corresponding disk surface; and
steps (a) through (d) are repeated a plurality of times for each head.

15. The method as recited in claim 9, wherein the disk further comprises a plurality of data tracks, further comprising the step of partitioning at least one of the data tracks into a plurality of data sectors in response to the starting track.

16. The method as recited in claim 15, further comprising the step of selecting a linear bit density for each data sector in response to the starting track.

* * * * *